May 10, 1949.  E. D. HALLOCK  2,469,385
RAZOR BLADE TESTING DEVICE
Filed April 6, 1945  3 Sheets-Sheet 1

INVENTOR.
Eugene D. Hallock
BY William F. Desmond
ATTORNEY

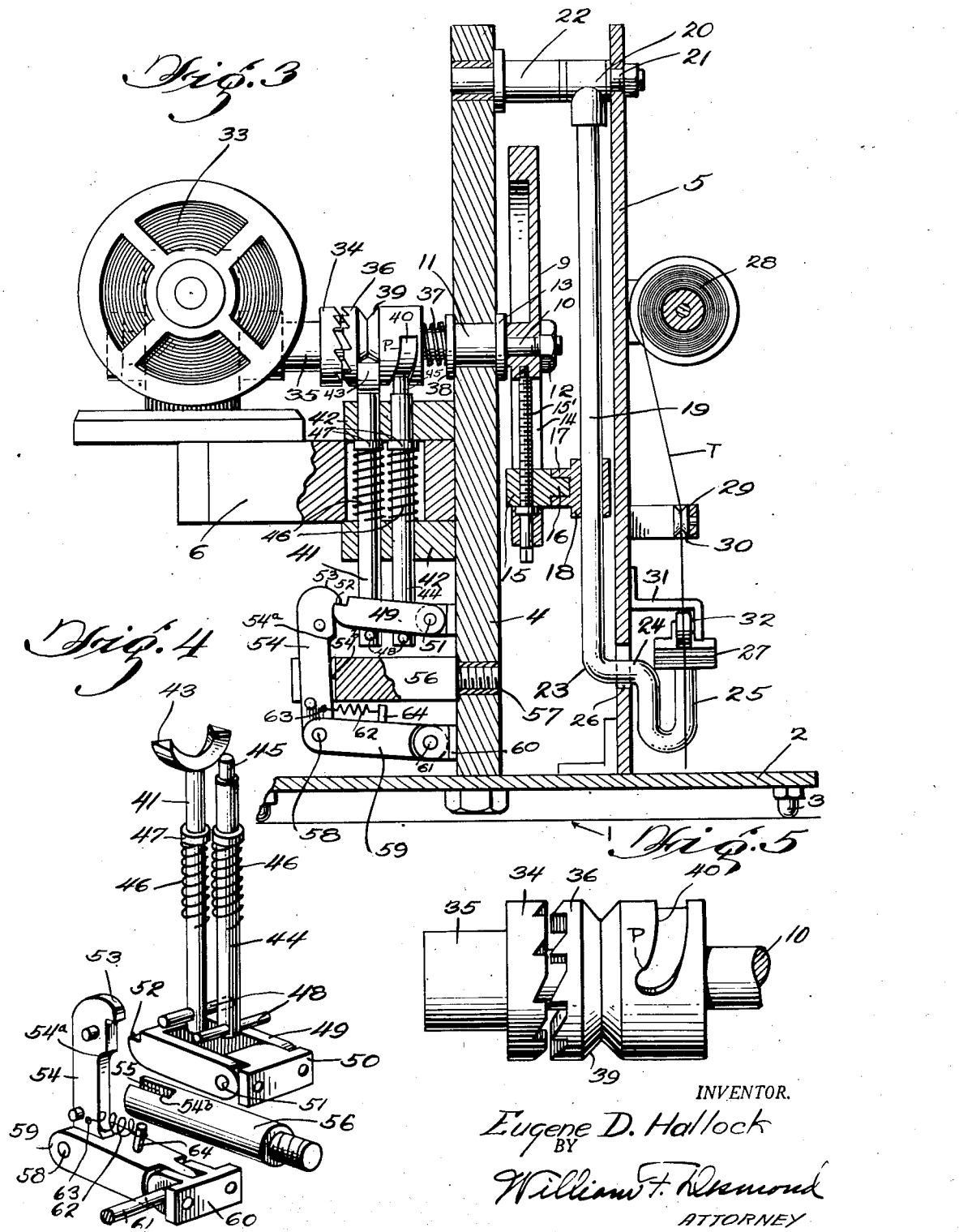

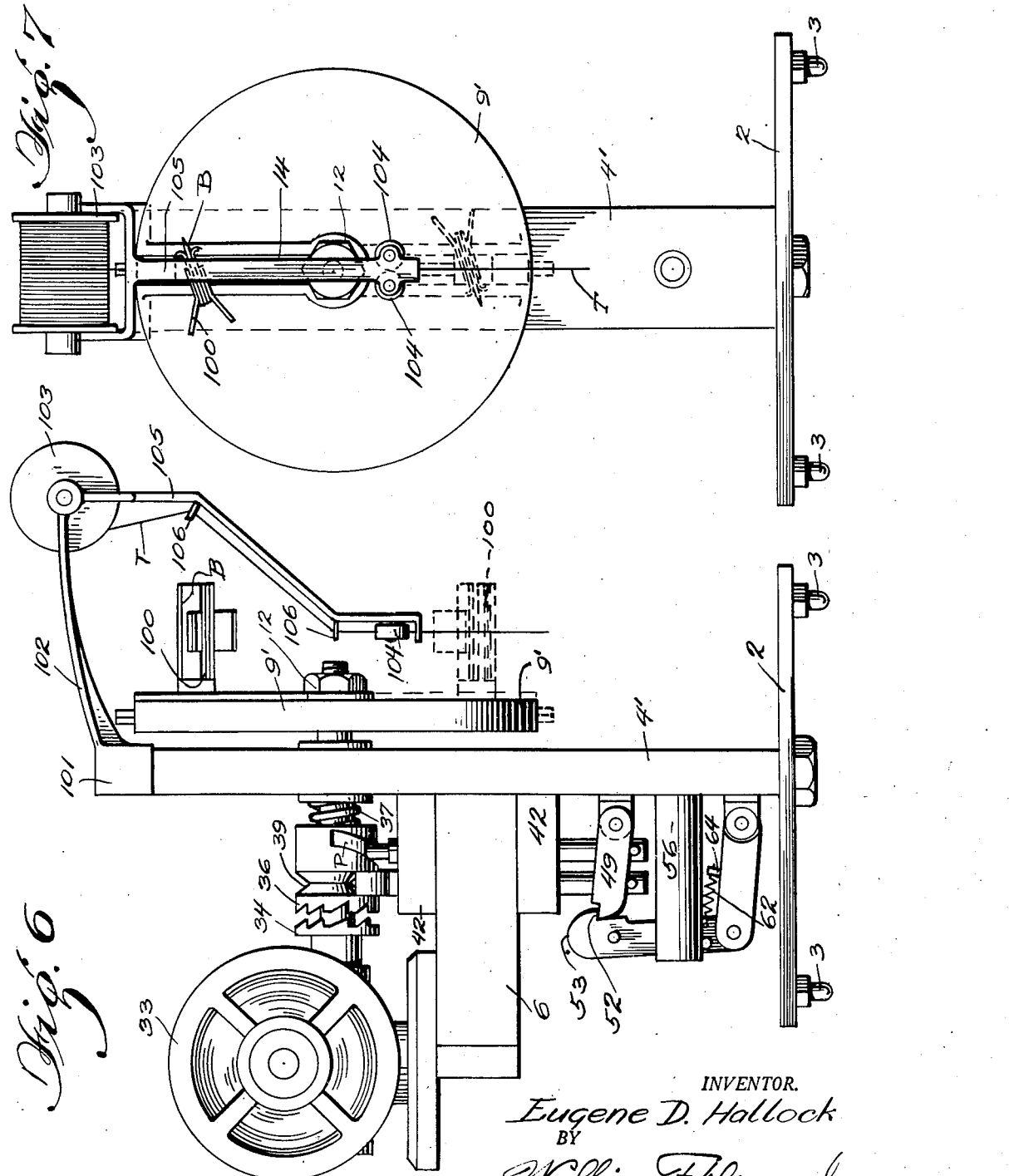

Patented May 10, 1949

2,469,385

UNITED STATES PATENT OFFICE 2,469,385

RAZOR BLADE TESTING DEVICE

Eugene D. Hallock, Snyder, N. Y.

Application April 6, 1945, Serial No. 586,999

11 Claims. (Cl. 73—104)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to method and means of testing cutting edges, and more particularly has reference to method and means of testing the sharpness of cutting edges, such as razor blades. It is evident, however, that the invention is not thus limited in scope and may be employed for testing other types of cutting edges.

After a razor blade has been thoroughly processed, it is subjected to various types of tests for detecting any imperfections in the blade. Perhaps the most important and difficult test to perform satisfactorily is the sharpness test. One of the tests to indicate blade sharpness is to cut a natural hair with the blade. The accuracy of this test is seriously impaired by the lack of uniformity in various threads of hair. There are, however, two testing methods which have proven quite satisfactory, but the primary disadvantage is that they are conducted with laboratory equipment, which means, of course, that highly trained technicians must be used to accomplish the testing. One of these testing methods is disclosed in Casselman Patent No. 1,983,597, assigned to the Magazine Repeating Razor Company, wherein the blade is moved at a predetermined velocity against a filament or fiber by the pull of gravity. The device is manually operated and the accuracy thereof is largely dependent upon the skill of the operator. Another testing method is covered in Patent No. 2,027,595, owned by the Gillette Safety Razor Company, and comprises the idea of directing a beam of light successively against the edges of the blades and by utilizing the intensity of the light reflected from successive edges it is possible to indicate relative degrees of blade sharpness. Obviously, this process likewise requires highly trained personnel, and, in addition, the equipment is quite expensive both in original cost and in maintenance.

It can be seen, therefore, that there is a real need for a testing method and machine which will check accurately the blade sharpness, and, yet be of a construction which will enable the use of unskilled persons to perform the testing operations. At the present time, the Government is purchasing millions of blades annually for the Armed Forces, and to meet the demand it is necessary that numerous different manufacturers supply the razor blades. The majority of these manufacturers do not have adequate testing equipment with the attendant result that a high per centage of the blades do not meet the minimum standard of quality established by the Government.

To overcome the problems mentioned above is one of the principal objects of the present invention.

Another object of my invention is to provide a method and means of testing the sharpness of a cutting edge wherein the cutting edge is positively moved at a predetermined velocity against a thread or filament maintained in its path of travel.

Yet another object of my invention is to provide a machine for determining the sharpness of a razor blade comprising a blade supporting means which is positively moved at a predetermined velocity against a fiber suspended in its path of travel.

A further object of this invention is to provide a razor blade sharpness testing machine with means whereby the velocity at which the blade moves may be varied to permit testing for any particular degree of sharpness desired.

Still another object of my invention is to provide a machine for testing the sharpness of cutting edges, such as razor blades, which is simple in construction and operation and which can be cheaply and easily manufactured.

A still further object of my invention is to provide a sharpness testing machine for razor blades wherein the blade to be tested is moved by a swingable arm against a thread at a predetermined velocity which is imparted thereto by power means, such as a constant speed motor.

Various other objects and advantages of this invention will appear more fully hereinafter. It is to be understood that the specific embodiment or embodiments shown are merely illustrative, and hence a detailed description thereof is not to be taken as limiting the invention per se.

Attention is invited to the accompanying drawings of the invention wherein like reference characters designate the same or similar part and in which Figure 1 is a front view of a testing machine which is partly broken away to shown the mode of adjustment of the swingable arm.

Figure 3 is a transverse sectional view taken along the line 3—3 of Figure 1 looking in the direction of the arrows, with the swingable arm in the cutting position.

Figure 4 is a diagrammatic representation of the mechanism whereby the clutch faces are engaged and disengaged.

Figure 5 is a view in side elevation of the clutch members.

Figure 6 is a side elevational view of a modified testing machine wherein the swingable arm is omitted and the blade is supported by the rotatable disc member.

Figure 7 is a front view of the machine illustrated in Figure 6.

Figure 1:
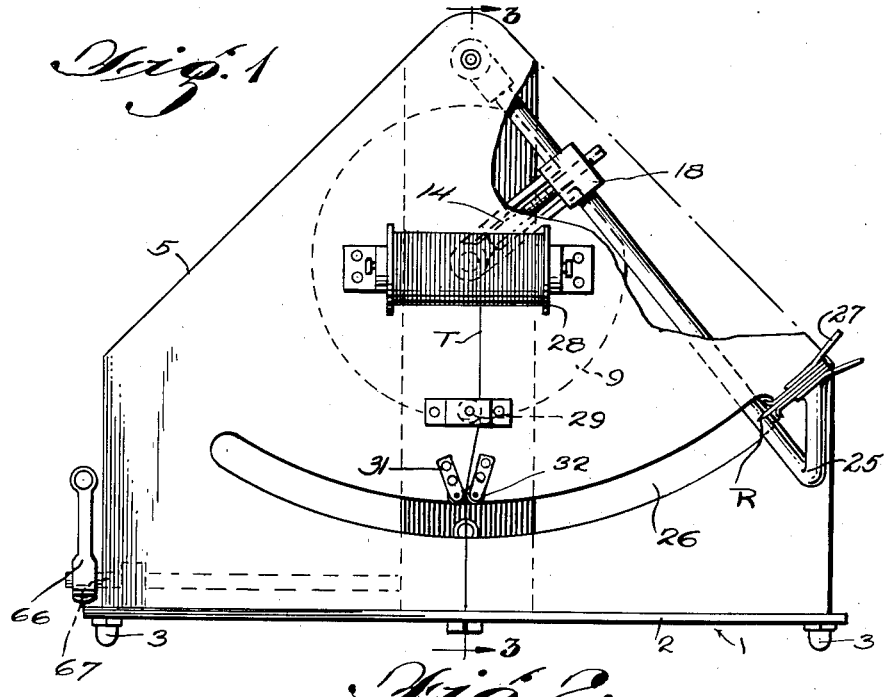
Figure 2:
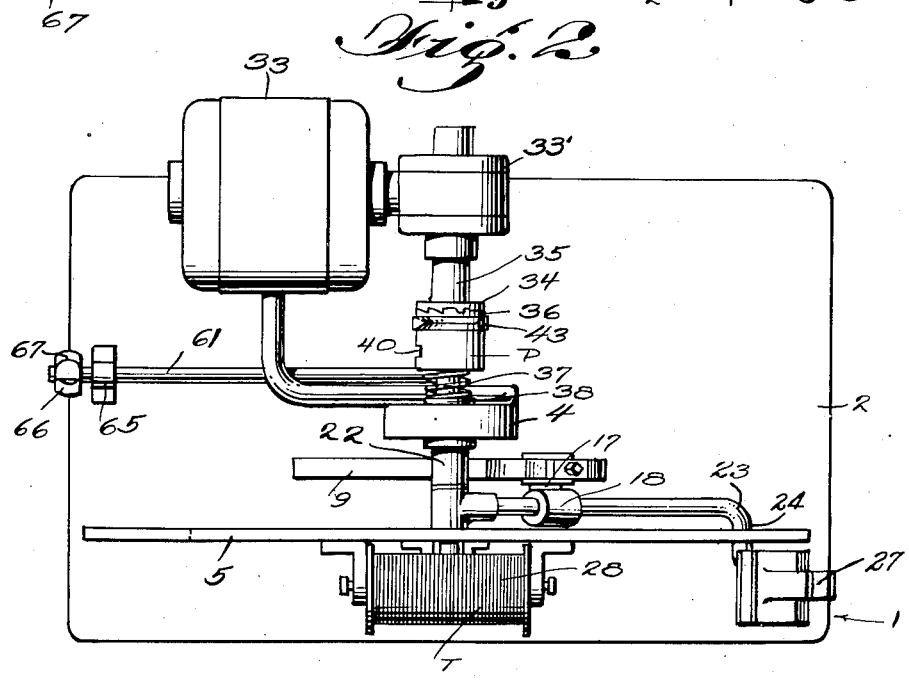
Figure 2 is a top plan view of the machine shown in Figure 1.

Broadly, the invention in its preferred embodiment comprises a swingable arm which carries a clamp adapted to hold the blade to be tested. The arm is adjustably connected to a rotatable disc which is rotated by a constant speed motor through a releasable clutch. A fiber or thread adapted to be cut by the blade is maintained in the path of travel of the blade. When movement is imparted to the rotatable disc, the swingable arm will be moved by virtue of the adjustable connection between the arm and the disc. The adjustable connection will permit the arm to be swung at a predetermined velocity and, as a consequence, impart a predetermined velocity to the blade at the zone of cutting. During the cutting operation the arm and hence the blade is positively driven by the constant speed motor.

In the modified form of the invention, the swingable arm is eliminated and the blade clamp is adjustably connected to the rotatable disc. Obviously with this arrangement, the blade will have circular motion instead of oscillatory movement as in the case of the swingable arm.

In Figure 3, there is shown a main frame 1 comprising a horizontal base 2 having supporting feet 3, vertical partition 4, front panel 5 and a horizontal shelf 6 suitably secured to the rear of the partition 4. A rotatable disc 9 is attached to a shaft 10 extending through a bushing 11 provided in the partition 4. The disc 9 is detachably secured to the shaft 10 by a nut 12 threaded on the outer end of the shaft and a washer 13 is interposed between the disc and the partition 4 to reduce or minimize friction.

A radial slot 14 (Fig. 1) extends from the hub of the disc to its outer circumference and a block 15 is secured in the slot for movement toward and away from the hub thereof upon a threaded adjusting rod 15' which has its opposite ends rotatably secured in the hub and rim of disc 9. The outer end of the rod projects outwardly from the rim and is shaped so that it can be grasped by a tool. By rotating the rod the block 15 can be adjusted along its length toward or from the hub of the disc 9. The block 15 has a lateral projection 16 which is seated in a recess 17 provided in a sleeve 18. A swingable arm 19 extends through the sleeve 18 and the upper end thereof is provided with an eye fitting 20. A shaft 21 extends through the eye fitting 20, and the ends thereof are journaled in the partition 4 and front panel 5 respectively. A spacer 22 is disposed between the fitting 20 and the outer face of the partition 4 for the usual purpose.

The lower end of the arm 19 is curved as shown at 23 and is then extended outwardly as shown at 24. The outwardly extending portion 24 projects through an arcuate slot 26 formed near the lower end of the front panel 5 and has a gooseneck 25. A blade holder or clamp designated by the numeral 27 is attached to the gooseneck 25, and it will be noted from Figure 1 that the clamp or holder is so arranged that the edge of the razor blade R will be positioned in a plane passing through the center of the arm 19 and the blade is disposed at an angle of approximately 85° thereto, the purpose of which will later become more fully apparent.

Mounted on the front panel 5 and at approximately the mid-point thereof is a spool 28 of a suitable filament. A thread T extends from the spool 28 through a pair of guide rollers 29 attached to the panel by brackets 30 disposed above the slot 26, and supported by brackets 31 is some suitable tensioning device such as rollers 32 adapted to hold the thread T under tension.

The means for imparting movement to the disc 9, and consequently to the swingable arm 19, will now be described. A constant speed synchronous electric motor 33 or other type of constant speed motor is mounted on the shelf 6 and is connected with driving clutch member 34 through gear 33' and shaft 35. Driven clutch member 36 is carried by the shaft 10 and helical spring 37 disposed around the shaft 10 between the clutch 36 and a collar 38 tends to force the teeth thereof into engagement with the teeth on clutch member 34. It can be seen in Figure 3 that the member 36 is formed with an annular V-shaped groove 39 and a cam slot 40 which extends approximately 90° around the clutch member 36. A rod 41 mounted in brackets 42 on the partition 4 is formed with a V-shaped shoe 43 at the upper end which is adapted to fit into the annular groove 39. A second rod 44 parallel to the rod 41 is also mounted in the brackets 42 and the upper end thereof is reduced as shown at 45. The end 45 is adapted to ride in the cam slot 40 on the clutch 36. A helical spring 46 surrounds each of the rods 41 and 44 and the upper end thereof bears against a collar 47 while the lower end of the spring contacts the lower bracket 42. The springs 46 will force the rods 41 and 44 upwardly into engagement with the annular groove 39 and cam slot 40 respectively. A pin 48 extends through each of the rods 41 and 44 adjacent the lower end, and these pins fit under a double link 49 which is pivoted to a bracket 50 attached to the partition 4 as shown at 51. The outer end of the link is cut away to provide a shelf 52, and hooked end 53 of a dog 54 engages the shelf. The dog 54 extends through a bifurcation 55 formed in a support 56 which is threaded into an opening 57 in the partition 4. The lower end of the dog 54 is pivoted as shown at 58 to a link 59 which in turn is pivoted to a bracket 60 secured to the partition 4 as indicated at 61. A coil spring 62 is attached to the dog 54 as at 63 and to a pin 64 on the link 59, and tends to urge the dog 54 to the right shown in Figure 3, or in engagement with the link 49. The pivot 61 is a rod which extends laterally of the frame and is supported adjacent its outer end by a bearing 65. An operating handle 66 located exteriorly of the frame 1 is suitably attached to the outer end of the rod at 67.

Before the testing device may be operated, certain factors must be determined and certain adjustments to the device must be made. The minimum degree of sharpness which will be acceptable must be ascertained since the sharpness of the blade is a function of the speed with which the arm 19 is traveling when it strikes the thread T. The velocity of the arm can be regulated by adjusting the position of the block 15 in the slot 14 with respect to the hub of the disc 9. The closer the block is to the hub the lesser the velocity of the arm 19 and vice versa.

After the necessary adjustment has been made respecting the swing arm 19 and a blade is in the clamp 27, the handle 66 is depressed thereby pulling the dog 54 downwardly by virtue of its pivotal connection to the link 59. This downward movement of the dog 54 will in turn move the link 49 downwardly about its pivot end as the link contacts the pins 48 on the rods 41 and 44, the rods will likewise be pulled downwardly. Simultaneously, the V-shaped shoe 43 and the reduced end 45 will leave the annular groove 39 and cam slot 40 in the driven clutch member 36 thereby enabling the spring 37 on the shaft 10 to force the teeth of the clutch 36 into engagement with the teeth on the clutch 34. Consequently, the shaft 10 will be rotated by the motor 33 and rotary movement will be imparted to the rotatable disc 9. Since the swingable arm 19 is connected to the disc by the block 15 and sleeve 18, it is evident that oscillatory movement will be given to the arm causing it to swing through the slot 26 toward the thread T at a predetermined velocity. If the blade severs the thread at this velocity it is acceptable; on the other hand, if the blade will not cut the thread it does not meet the minimum standard required and hence is discarded.

As soon as cam surface 54a of the dog 54 contacts the surface 54b of the support 56 it will be cammed outwardly, thus disengaging the tooth 53 from the shelf 52 on the link 49. Since the link 49 is no longer held by the dog 54, the springs 46 will urge the rods 41 and 44 upwardly and the V-shaped shoe 43 and the reduced end 45 will ride on the periphery of the clutch member 36. As soon as the shaft has completed one revolution, the reduced end 45 will enter the cam slot 40 and when it reaches the point P, it will pull the clutch member 36 toward the right (Fig. 3) and compress the spring 37 thus disengaging the clutch faces and at this time the shoe 43 will center itself in the annular groove 39. As a result, no rotary motion will be transmitted to the disc until the arm 66 has again been depressed.

It will be appreciated that with the above method and machine it is possible to test accurately the sharpness of cutting edges without the employment of highly trained technicians, and the method can be easily and inexpensively performed. Also, the arm carrying the blade is moved at a predetermined velocity to the cutting zone, and the velocity can be expeditiously adjusted to test the sharpness of the edge within relatively narrow limits.

Referring to Figures 6 and 7 there is shown another form of apparatus, and the primary distinction is that the swingable arm 19 is omitted and the blade is carried directly by the rotatable disc. For the purpose of simplification, parts corresponding to those shown in Figure 1 will bear the same reference numeral with the exception that they are primed.

In this embodiment, the front panel 5 is eliminated and blade holder or clamp 100 is mounted in the radial slot 14' of rotatable disc 9'. Manifestly, when disc 9' is rotated, the clamp 100 and blade B will have rotary movement instead of oscillatory movement as in the case of the swingable arm 19.

Mounted on the top of the partition 4' is a bracket 101 having parallel spaced spring arms 102 into which a spool 103 is fitted. The thread T is threaded through the guides 106 and between rollers 104 supported by arm 105 attached to the arm 102. It will be observed that the thread lies in the path of movement of the blade holder 100.

With this form of machine, the mode of operation is substantially identical to that of Figure 1, but the blade holder 100 instead of having an oscillatory motion has a rotary motion.

It is to be understood that various modifications of the above principles will be apparent to those skilled in the art without departing from the scope of the invention, and it is to be limited only by the teaching of the prior art and the claims appended hereto.

In the claims the words "positively driven" signify that the blade is moved by power means and not by the force of gravity.

I claim:

1. In an apparatus for testing the sharpness of a cutting edge, means to support the cutting edge, an obstruction capable of being severed by the cutting edge in the path of movement of the cutting edge, means to positively drive the cutting edge against the obstruction, and additional means to adjust the driving means to vary the velocity of the cutting edge supporting means.

2. In an apparatus for testing the sharpness of a cutting edge, a swingable arm, means supporting the cutting edge on the swingable arm, an obstruction capable of being severed by the cutting edge in the path of movement of the cutting edge, means to positively drive the swingable arm and cutting edge against the obstruction, and additional means to adjust the driving means to vary the velocity of the swingable arm.

3. In an apparatus for testing the sharpness of a cutting edge, a swingable arm, means to secure the cutting edge to the swingable arm, a rotatable member, means connecting the swingable arm to the rotatable member, an obstruction capable of being severed by the cutting edge in the path of movement of the cutting edge, and power means to rotate the rotatable member thereby moving the swingable arm and cutting edge against the obstruction.

4. A machine for testing the sharpness of a cutting edge comprising means to hold the cutting edge, a filament capable of being severed by the cutting edge in the path of movement of the cutting edge, power means to move the cutting edge against the filament at a predetermined velocity, clutch means to connect and disconnect the power means with cutting edge holding means, and means to determine the velocity of the cutting edge holding means.

5. A machine for testing the sharpness of a cutting edge comprising a swingable arm, means securing the cutting edge to the swingable arm, a filament capable of being severed by the cutting edge in the path of movement of the cutting edge, power means to move the swingable arm and cutting edge against the filament at a predetermined velocity, clutch means to connect and disconnect the power means with the swingable arm, and means to determine the velocity of the swingable arm.

6. A machine for testing the sharpness of a cutting edge comprising a support, a swingable arm pivoted at one end to the support, a clamp for holding the blade carried at the other end of the arm, a filament capable of being severed by the cutting edge maintained in the path of movement of the cutting edge, power means to move the swingable arm at a predetermined velocity against the filament, clutch means to connect and disconnect the power means with the swingable arm, and means to determine the velocity at which the arm will move.

7. A machine for testing the sharpness of a cutting edge comprising a support, a swingable arm pivoted at one end to the support, a clamp for securing the cutting edge carried at the other end of the arm, a filament capable of being severed by the cutting edge maintained in the path of movement of the cutting edge, a rotatable disc, a connection between the swingable arm and the rotatable disc, power means, clutch means to connect and disconnect the power means with the rotatable disc whereby a predetermined velocity may be imparted to move the swingable arm and cutting edge against the filament.

8. A machine for testing the sharpness of a cutting edge comprising a support, a swingable arm pivoted at its upper end to the support, a clamp for securing the cutting edge carried by the lower end of the arm, a filament capable of being severed by the cutting edge maintained in the path of movement of the cutting edge, a rotatable disc journaled in the support and spaced from the swingable arm, a constant speed motor, clutch means to connect and disconnect the motor with the rotatable disc whereby a predetermined velocity may be imparted to move the swingable arm and cutting edge against the filament.

9. In a machine for testing the sharpness of cutting edges, a rotatable member, means to secure a cutting edge to the rotatable member, means to adjust said securing means radially of the rotating member means to maintain a fiber capable of being severed by the cutting edge in the path of travel of the cutting edge, and means to rotate said rotatable member whereby the cutting edge will be moved at a predetermined velocity against the fiber.

10. In a machine for testing the sharpness of cutting edges, a rotatable member, radially movable means to secure a cutting edge to the rotatable member, means to maintain a fiber capable of being severed by the cutting edge in the path of travel of the cutting edge, means to rotate the rotatable member to move the cutting edge at a predetermined velocity against the fiber, and means to adjust said securing means to vary the velocity at which the cutting edge will move.

11. A machine for testing the sharpness of a cutting edge comprising a support, a swingable arm pivoted at its upper end to the support, a clamp for the cutting edge at the lower end of the arm, a filament capable of being severed maintained in the path of travel of the cutting edge, a rotatable disc journaled in the support spaced from the swingable arm, a connection between the disc and swingable arm, a constant speed motor, a clutch for connecting and disconnecting the motor with the rotatable disc whereby the swingable arm and cutting edge may be moved against the filament, and means to adjust the connection between the disc and swingable arm to vary the velocity at which said arm moves.

EUGENE D. HALLOCK.

REFERENCES CITED

The following references are of record in the file of this patent:

UNITED STATES PATENTS

| Number | Name | Date |
|---|---|---|
| 1,108,928 | Nickerson | Sept. 1, 1914 |
| 1,780,822 | Honda | Nov. 4, 1930 |
| 1,983,597 | Casselman | Dec. 11, 1934 |
| 2,008,678 | Brown | July 23, 1935 |